United States Patent [19]

Spinosa et al.

[11] Patent Number: 4,715,561
[45] Date of Patent: Dec. 29, 1987

[54] DRAIN ASSEMBLY FOR AIRCRAFT

[75] Inventors: Dominic J. Spinosa, Wantagh, N.Y.; Frank Knoll, Huntington Station, both of N.Y.

[73] Assignee: East/West Industries, Inc., Hauppauge, N.Y.

[21] Appl. No.: 926,466

[22] Filed: Nov. 3, 1986

[51] Int. Cl.$^4$ .................. B64C 1/00; F16K 31/122
[52] U.S. Cl. .................. 244/129.1; 137/81.1; 137/430
[58] Field of Search .......... 244/118.5, 129.1; 137/81.1, 505, 505.31, 505.4, 517, 519.5, 433, 388, 197, 199, 216, 217, 430

[56] References Cited

U.S. PATENT DOCUMENTS

| | | | |
|---|---|---|---|
| 3,736,951 | 6/1973 | Purtell | 137/217 |
| 4,463,774 | 8/1984 | Gorges et al. | 214/129.1 |
| 4,506,851 | 3/1985 | Gupta et al. | 244/129.1 |

Primary Examiner—Jeffrey V. Nase
Assistant Examiner—Rodney Corl
Attorney, Agent, or Firm—Hoffmann & Baron

[57] ABSTRACT

A drain assembly for aircraft which is operable to provide a drainage outflow course for discharge of cabin collecting liquids in an aircraft to the outside environment when the aircraft is at ground level or operating at altitudes up to a certain height but which is operable to seal tight that drainage course when the aircraft is operating above that certain height so that cabin depressurization cannot occur through the drainage course.

24 Claims, 8 Drawing Figures

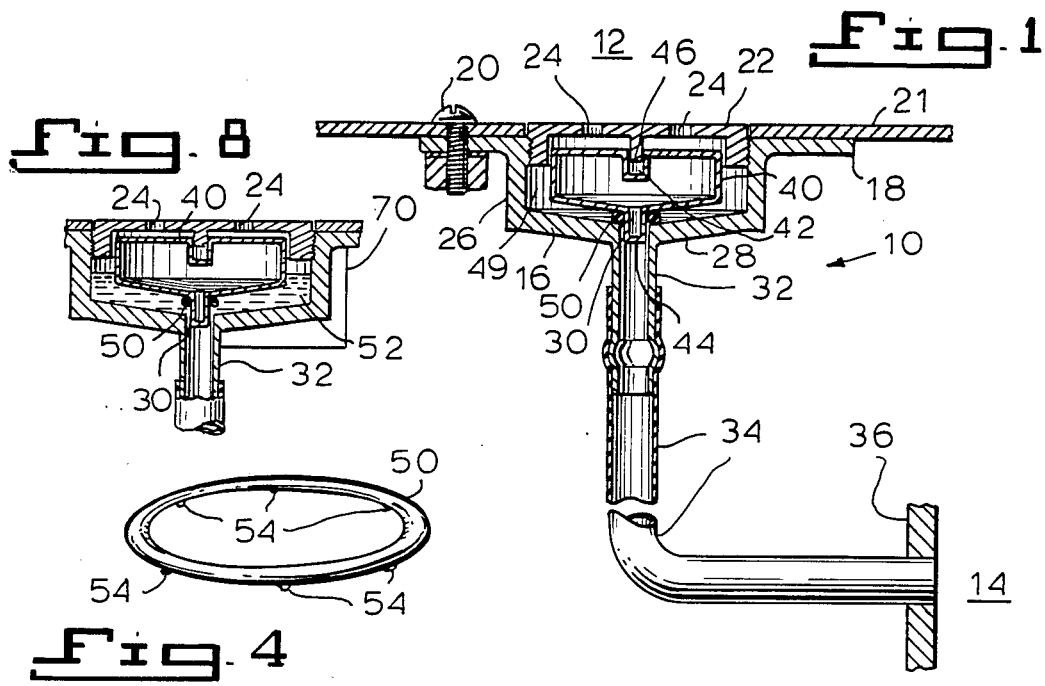

DRAIN ASSEMBLY FOR AIRCRAFT

BACKGROUND OF THE INVENTION

This invention relates to drain devices and refers more particularly to a drain assembly for use with a pressurized compartment such as found in aircraft and like vehicles operating at high altitude levels.

Liquids can accumulate for various reasons in the cabin space of aircraft type vehicles. For example, liquid spill of beverages can occur where a pilot or passenger is taken unaware by a sudden change in aircraft altitude. In small aircraft such as a military fighter plane, relief tube body waste discharge can be present in the cabin space. In addition, a military aircraft sitting at a maintenance site can have its cockpit cover open when a sudden downpour of rain occurs and a quantity of rainwater enters the cockpit before a mechanic can close the cover. For this reason, it is desirable that overboard drainage be provided so that liquid accumulation readily and conveniently can be discharged from the cabin to the extra vehicle environment. However, the drainage capability must be provided in such manner as takes into account the requirement for maintaining pressurized condition in the cabin when the aircraft is operating at certain altitude levels. Depending on altitude, cabin pressures can vary over a range from 0 to about 10 psig. Accordingly, any devices employed for drainage purposes must not allow for the possibility that cabin depressurization could occur through the drainage device at least where cabin pressures above a certain magnitude are involved. At the same time, the drainage device should be operable to allow for drainage at pressures below this certain magnitude so that cabin liquid accumulation which commonly may be of corrosive nature, is a hazard to electrical devices as well as being malodorous, can be discharged overboard from the aircraft.

SUMMARY OF THE INVENTION

One object of the invention is to provide a drain assembly for a pressurized environment, which permits drainage communication below a certain pressure and which seals the compartment under a pressurized condition above that certain pressure.

Another object of the present invention is to provide a drain assembly for use in aircraft and similar vehicles which operate at high altitude levels that will remain positively closed off at altitudes above a certain level to prevent loss of pressurization in the aircraft cabin space at such high altitude levels.

Still a further object of the invention is to provide a drain assembly which is operatively effective at ground level and at altitudes up to a certain level to allow continuous drain course communication between the cabin space and the outside or extra vehicle environment to therewith allow continuous drainage from the cabin space of any liquid as may be present therein.

The drain assembly of the present invention is such as to allow for aircraft cabin drainage at ground level and at aircraft operating altitudes up to heights wherein there exists a first cabin pressure value such as one below a certain predetermined value, i.e., below about 4 to 5 psig. When the aircraft operating altitude requires pressurization above that predetermined pressure value, and there exists a second cabin pressure above that predetermined value, the drain assembly will block or seal off any drainage flow course communication between the aircraft cabin or like compartment space and the extra vehicle environment.

In accordance with the present invention, the drain assembly includes a housing mountable in an aircraft cabin, such as in the cabin floor and providing a liquid collection well. A cover having one or more liquid access openings can be received on or secured to the top of the housing. A well outlet is provided at the bottom of the housing and it can by suitable means such as carry-off tubing, be connected to a point outside the cabin, e.g., a location on the outside surface of the aircraft fuselage.

A float is disposed in the well and is guided to move upwardly and downwardly therein toward and away for the well outlet so that a seal member carried at the underside of the float can close off and tightly seal the well outlet when a second cabin pressure forces the float downwardly in the well. The well is sized so that it can accommodate the float along with an amount of liquid which can buoy the float when a first pressure value exists in the cabin to move it upwardly in the well away from the outlet. The float has predetermined size, shape, and weight and is disposed such that side clearance exists between the float and an encircling side wall part of the housing so that liquid entering the housing from the cabin space thereby always has a pass down course to the bottom of the well.

During first cabin pressure condition, a fluid communication course always exists between the cabin space and the extra cabin environment. This is because circularly discontinuous spacer means such as spheroid projections are carried either on the seal member or on the housing bottom wall adjacent the well outlet and, these spacer means serve (in the absence of a float buoying quantity of liquid in the well) to keep the seal member spaced a distance above the well outlet and there is through passage between the spacers and under the seal member for liquid to pass from the well through the outlet opening.

On the other hand, and since it is necessary to seal off the flow course at second cabin pressure values to prevent leakage of cabin air through the drain assembly, the seal member is made as a resilient member (preferably in O-ring form) readily compressible so that when the second cabin pressure forces the float downwardly in the well, the seal member can deform around the spacer means to establish a continuous encircling sealing engagement with the well bottom wall about the well outlet and blocking any flow therethrough.

The invention accordingly comprises the features of construction and arrangements of parts as embodied in the drain assembly construction as will be exemplified in the description hereinafter set forth and the scope of the invention will be indicated in the claims.

BRIEF DESCRIPTION OF THE DRAWINGS

A fuller understanding of the nature and objects of the invention will be had from the following detailed description taken in conjunction with the accompanying drawings, in which:

FIG. 1 is a vertical central sectional view taken through the drain assembly showing how same is secured to a compartment floor, such as the cabin floor in an aircraft to admit liquid flow to the well and showing further the manner of communicating the well by means of a carry-off tube to extra compartment environment;

FIG. 2 is a fragmentary sectional view on an enlarged scale showing the positioning of the seal member carried on the underside of the float on top of the spacer means which in the depicted embodiment are provided as projections extending upwardly from the well bottom wall and are arranged in spaced circular array about the well outlet;

FIG. 3 is a fragmentary sectional view on further enlarged scale showing the manner in which the resilient seal member compresses against and around the spacer means shown in FIG. 2 to form a fully encircling tight seal of the well outlet at second cabin pressure values;

FIG. 4 is a perspective view depicting the arrangement wherein the seal member spacer projections are carried on the underside of the resilient seal member as a part thereof.

FIG. 5 is a transverse sectional view of the resilient seal member shown in FIG. 4.

FIG. 6 is a transverse sectional view of another embodiment of seal member wherein the spacer means are formed integrally therewith but as a circularly discontinuous skirt at the underside of the resilient seal member;

FIG. 7 is an enlarged fragmentary sectional view depicting the manner in which the projections carried at the underside of the FIGS. 4 and 5 seal member deflect upwardly and the seal member compresses against and around same to establish well outlet sealing when the seal member is forced tightly against the by well bottom wall by a cabin second pressure value; and FIG. 8 is a fragmentary sectional view of the assembly shown in FIG. 1 but depicting a buoyed position of the flotation device within the well.

Throughout the following description like referenced numerals are used to denote like parts in the drawings.

DESCRIPTION OF THE PREFERRED EMBODIMENTS

Referring to FIG. 1, the drain assembly 10 is employed to establish drain course communication between an aircraft compartment 12 such as an aircraft cabin, cockpit, etc. and the extra vehicle environment 14. While but one such assembly is shown, it will be understood that plural identical ones of such assemblies may be installed in the compartment depending on the size and shape of the space to be drained etc. The drain assembly includes a cup-like housing 16 made, for example, from stainless steel and formed with an annular flange 18, it being secured as with screws 20 at a number of flange locations to the floor 21 of compartment 12, the housing being fitted with a cover 22 which in the depicted form is thread connected with the housing although other manners of connection could be used. The cover is provided with a number of openings 24 so that liquid present on the floor can flow into the well space defined by encircling wall 26 of the housing.

The housing 16 includes a bottom wall 28 integral with side wall 26 and a well outlet opening 30 is formed in the bottom wall. The bottom wall can be shaped downwardly toward the outlet 30 as indicated although this is not essential. A nipple 32 extends downwardly from the bottom wall and is tightly covered with one end of a waste tube 34 and which tube at its other end extends to a location exposed to the extra vehicle environment, the said other tube end terminating at the fuselage skin 36.

A flotation device such as float 40 is received in the housing well space, the float being a fully enclosed structure having buoyancy character and including a blind bore passage as at 42 and a stempiece 44 extending downwardly from the float body, the passage and the stempiece being centrally disposed in the float. The float 40 can be made of molded thermoplastic material and is a lightweight structure, e.g., being made of styrofoam and could for the particular application weigh less than one ounce. A guide pin 46 at the underside of cover 22 locates in bore passage 42 to guide the float during upward and downward movements thereof as will be explained in more detail later on and the stempiece tip end locates within the bore of nipple 32, the stempiece diameter being less than the inner diameter of the nipple. The guided movement of the float is at all times such and the float is so sized and shaped that a side clearance as at 49 exists between the float and the inner annular surface of cover 22 and that of housing wall 26 to provide a liquid pass down course for liquid entering cover openings 24 to communicate to the well space and the underside of the float.

A resilient seal member 50, such as an O-ring encircles float stempiece 44 and is snubbed up tightly against the underside of the float, the seal member when the float is urged downwardly at a second cabin pressure (as will be explained below) engaging the housing bottom wall in an encircling sealing path about outlet 30 and cooperating with the float structure such that any flow course communication between cabin space 12 and the outside environment 14 is blocked.

The volume of the well defined by housing 16 is sufficient to hold the float 40 along with an amount of liquid 52 (as shown in FIG. 8) to buoy or displacingly lift float 40 upwardly away form outlet 30 when and if a sufficient well volumetric inflow of liquid is present at first cabin pressure or if there was an accumulation of liquid in the well at a second cabin pressure where overboard draining is blocked and the aircraft cabin pressure was thereafter reduced to a first cabin pressure value.

When the cabin 12 is at the first pressure value, the drain assembly is intended to allow continuous drainage of liquid from the cabin and unimpeded drainage flow course communication between the cabin and outside environment 14 exists. To provide that capability, there is embodied in the assembly means to space the seal member a distance above outlet 30 so that even if there was an insufficient quantity of liquid to displace the float away from the outlet, the seal member cannot at first cabin pressure block-off communication between the well and the outlet thereof. This is provided by the spacer projections shown in various forms thereof in FIGS. 2-7 and will be described next, the spacer projections not being seen in FIGS. 1 and 8 because of the small size thereof and the scale used in said two Figures.

The spacer projections can be provided as structure either on the housing bottom wall adjacent outlet 30 (FIGS. 2 and 3) or they can be provided as appendages on the bottom of the seal member 50 (FIGS. 4-7). Referring now to FIGS. 2 and 3, projections 54 are disposed on the housing bottom wall 28 in a circularly spaced or discontinuous array of such, the array including a suitable number of such, e.g., three or more projections. The projections can be formed in this instance when the housing 16 is being fabricated in any of a number of known ways. The projections each have a height which will be one that allows for sufficient spacing of the seal member above the outlet at first pressure condition to insure adequate volume and rate drain flow from the well. The height could, for example, be of about 0.050 inch and the projections can have various configurations such as the truncated cone (FIG. 2) or the parti-spheroid shape shown in FIG. 3. They will of course have a smooth exterior surface to prevent tearing or otherwise damaging the seal member.

As seen in FIG. 2, the seal member 50 will under a first cabin pressure condition and if it has not been floated by liquid away from outlet 30, sit on top of the projections 54 leaving a space between the underside of the seal member and the housing bottom wall 28 through which liquid can flow from the well through outlet 30 and thence through nipple 32 and waste tube 34 to the extra vehicle environment 14. Seal member 50 is made of resilient material such as a natural rubber composition and of such characteristics that the member will support the weight of the float 40 and resist the downward urging effect of first cabin pressure values thereon without any appreciable compression of the seal member against and around the projections taking place and thus drain egress under the seal member to outlet 30 remains.

On the other hand when cabin pressure raises to a second pressure value, the effect of this pressure on the float is to force it and hence the seal member, down tightly against the housing bottom wall to establish an encircling seal course about the outlet to block any flow through that port and in which circumstance, the seal member due to its resilient character compresses against and around the projections 54 as shown in FIG. 3 so that the presence of the projections does not effect the seal course effected with the seal member and there is therewith established an effective, absolutely tight, block of the drain flow course to preclude cabin depressurization flow through the drain assembly.

FIGS. 4–7 show the alternative arrangement where the projections 54 are formed on the seal member itself. In the FIGS. 4 and 5 arrangement, the projections are parti-spheroid and extend downwardly and in a circular array of, e.g., six projections. In the FIG. 6 form, the projections can be provided as a discontinuous skirt at the bottom of the seal member. FIG. 7 illustrates how the seal member at second cabin pressure compresses around the projections.

In connection with operation of the drain assembly at second pressure values wherein the seal member is forced down tightly against the housing bottom wall, it will be appreciated that there may on occasion occur creation of a negative pressure in the interior of the nipple 32 or drain tube 34 and sufficient to retain liquid in such components. Upon later return to a first pressure value in the aircraft compartment where the seal member should again occupy a position spaced above the outlet 30, the negative pressure in the nipple or drain tube could hold the seal member down tightly sealed around the outlet. In such case the vacuum in the nipple or tube would have to be broken to allow restoration of proper drain assembly operation. This can be avoided by providing a very narrow vent conduit 70 (FIG. 8) connecting the nipple interior or the tube interior to the compartment space 12. The conduit 70 need have an inner diameter of only about 0.010 inch to be satisfactory for this purpose. Air flow therethrough is possible but liquid flow is effectively precluded due to the dimension involved and the constraint a tube of such small size would place liquid flow through it.

It will be seen from the foregoing description that there is thus provided a highly effective drain assembly for use in aircraft which is operable to allow continuous cabin liquid drainage at first cabin pressures up to a predetermined magnitude (about 4 to about 5 psig) but which at second cabin pressures above that predetermined magnitude tightly seals off the drain course through the assembly to prevent cabin depressurization.

It will be apparent that certain alternate arrangements are possible in the drain assembly. For example, the seal number while depicted as being carried on the float underside could just easily be received in an annular groove formed in the bottom wall about 30, and the underside of the float would be forced against the seal member to effect drain course blocking. In that arrangement, tha spacer projections could be carried on the underside of the float.

While there is above disclosed only certain embodiments of the present invention it will be apparent that variations can be made therein by those skilled in the art without departing form the scope of the inventive concept disclosed.

What is claimed is:

1. Drain assembly for use in a pressurized compartment environment, said drain assembly being normally operable at first compartment pressure which is any pressure below a certain predetermined value to provide fluid communication between the interior of said compartment and the extra compartment environment, and said drain assembly further operable to seal against said fluid communication at a second compartment pressure which is any pressure above said certain value, said drain assembly comprising:
    a housing defining a well space open to the compartment and having an outlet communicating with a point outside said compartment,
    a flotation device, said well space having volume sufficient to hold said flotation device along with an amount of liquid which floats the device at first compartment pressure,
    said flotation device having size, shape and weight to fit in said well and when floated provides a fluid drain course between said compartment and outside point at first compartment pressure whereby liquid entering said housing from said compartment passes through said outlet to said outside point, and
    sealing means provided to cooperate with said housing and said floatation device to permit passage of liquid through said fluid drain course at first compartment pressure and to seal said fluid drain course at second compartment pressure.

2. The drain assembly of claim 1 in which the sealing means comprises a seal member carried on the flotation device and moved into well outlet blocking position when second compartment pressure urges said flotation device in a counter-flotation direction.

3. The drain assembly of claim 2 in which the flotation device is guided to move in the well space toward and away from said outlet.

4. The drain assembly of claim 3 in which the housing includes an encircling wall and the flotation device is spaced from said wall.

5. The drain assembly of claim 4 in which the housing includes a bottom wall, the well outlet being formed in said bottom wall.

6. The drain assembly of claim 5 in which the seal member is carried on the underside of said flotation device and in a position to effect encircling well outlet blocking when the flotation device is urged downwardly by second compartment pressure.

7. The drain assembly of claim 6 in which the seal member is made of resilient material, there being circularly discontinuous spacer means carried on one of said seal member and the housing bottom wall adjacent said well outlet for maintaining said seal member spaced from said bottom wall at first compartment pressure, the seal member being sufficiently resilient to compress about said spacer means and form a continuous seal encirclement about said well outlet when second compartment pressure urges the flotation device toward said outlet.

8. The drain assembly of claim 7 in which the spacer means comprises a plurality of projections upstanding from the surface of said bottom wall.

9. The drain assembly of claim 8 in which said projections are arrayed in circular spacing one from another.

10. The drain assembly of claim 9 in which the projections are parti-spheroid.

11. The drain assembly of claim 8 in which the projections extend upwardly from the bottom wall a distance of about 0.050 inches.

12. The drain assembly of claim 7 in which the spacer means comprises a plurality of projections carried on the seal member and extending downwardly thereupon.

13. The drain assembly of claim 12 in which the projections are arranged in circular array about said seal member.

14. The drain assembly of claim 12 in which the projections are parti-spheroid in shape.

15. The drain assembly of claim 12 in which the projections extend downwardly form the seal member a distance of about 0.050 inches.

16. The drain assembly of claim 2 in which the seal member comprises an O-ring carried at the underside of said flotation device.

17. The drain assembly of claim 3 in which the housing is a cup-shaped body secured to the cabin floor, said body having a lower wall in which the outlet port is formed, there being a downwardly directed nipple extending from said lower wall and communicating with said outlet, there further being a tube connected to said nipple and extending to the extra compartment environment.

18. The drain assembly of claim 17 in which said lower wall inclines downwardly to a low point thereof at said outlet port.

19. The drain assembly of claim 17 in which the flotation device includes a stempiece at the underside thereof, the seal member being an O-ring encircling said stempiece and snubbed up against the device underside.

20. The drain assembly of claim 17 further comprising a cover member secured to the top of said cup-shaped body, said cover member carrying a depending guide engageable with a companion guide means in said flotation device for effecting float movement guidance as it moves toward and away from said outlet.

21. The drain assembly of claim 7 in which the resiliency/compressibility characteristics of the seal member are such as to resist compressing of same about said spacer means at cabin pressures up to about 4 to 5 psig.

22. The drain assembly of claim 21 in which the seal member is made of a natural rubber composition.

23. The drain assembly of claim 17 further comprising vent means communicating the interior of said cabin with one of said nipple interior and said tube interior to preclude existence of negative pressure in said interiors at least when the cabin is at a first pressure.

24. The drain assembly of claim 23 in which the vent means is a narrow conduit having an inner diameter of about 0.010 inch.

* * * * *